(12) United States Patent
Hussain et al.

(10) Patent No.: US 9,469,769 B1
(45) Date of Patent: Oct. 18, 2016

(54) ANTI-CORROSION TREATMENT COMPOSITION FOR STEEL REBAR EMBEDDED IN CONCRETE

(71) Applicant: KING SAUD UNIVERSITY, Riyadh (SA)

(72) Inventors: Raja Rizwan Hussain, Riyadh (SA); Abdulrahman M. Alhozaimy, Riyadh (SA); Abdulaziz I. Al-Negheimish, Riyadh (SA); Devendra Deo Narain Singh, Benares (IN)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 14/985,301

(22) Filed: Dec. 30, 2015

(51) Int. Cl.
*C09D 5/08* (2006.01)

(52) U.S. Cl.
CPC .................................. *C09D 5/08* (2013.01)

(58) Field of Classification Search
CPC ......... C09D 5/08; C23F 11/00; C04B 22/16; C04B 24/04; C04B 2103/61
See application file for complete search history.

(56) References Cited

U.S. PATENT DOCUMENTS

| | | | |
|---|---|---|---|
| 5,686,185 A | 11/1997 | Correll et al. | |
| 7,833,331 B2 | 11/2010 | Sturgill et al. | |
| 8,679,632 B2 | 3/2014 | Smith | |
| 8,906,990 B2 * | 12/2014 | Wan | C09D 5/08 148/113 |
| 2004/0224168 A1 | 11/2004 | Jennings et al. | |
| 2013/0180947 A1 * | 7/2013 | Kim | H01L 27/124 216/13 |

FOREIGN PATENT DOCUMENTS

CN 104231912 A 12/2014

* cited by examiner

*Primary Examiner* — Anthony J Green
(74) *Attorney, Agent, or Firm* — Richard C. Litman

(57) ABSTRACT

The anti-corrosion treatment composition for steel rebar embedded in concrete is a composition for coating steel rebar before the steel rebar is embedded in concrete. The coating of the steel rebar with the anti-corrosion treatment composition forms a treatment film on the steel rebar which controls both uniform corrosion and pitting corrosion of the steel rebar after it has been embedded in the concrete. The anti-corrosion treatment composition includes an inorganic acid, an organic acid, polyethylene glycol and water. The inorganic acid forms between approximately 3.9 wt % and approximately 15.0 wt % of the anti-corrosion treatment composition, the organic acid forms between approximately 0.1 wt % and approximately 2.9 wt % of the anti-corrosion treatment composition, the polyethylene glycol forms between approximately 2.0 wt % and approximately 10.7 wt % of the anti-corrosion treatment composition, and the remainder of the anti-corrosion treatment composition is water.

16 Claims, 2 Drawing Sheets

ANTI-CORROSION TREATMENT COMPOSITION FOR STEEL REBAR EMBEDDED IN CONCRETE

BACKGROUND OF THE INVENTION

1. Field of the Invention

The present invention relates to a treatment composition for steel rebar embedded in concrete, and particularly to a treatment composition for applying to the surface of steel rebar prior to embedding in concrete to provide protection against corrosion of the steel.

2. Description of the Related Art

Steel rebar is commonly used for the reinforcement of concrete. Typical manufactured steel rebar is often coated with black oxide (i.e., "mill scale"), which is a mixture of three phases of iron oxide, namely wüstite (FeO) near the steel surface, magnetite ($Fe_3O_4$) above the layer of wüstite, and a top portion of the scale formed from hematite ($\alpha$-$Fe_2O_3$). These layers of iron oxides develop cracks, since their coefficients of expansion and compaction due to changes in temperature differ to a significant extent than those of the steel structure.

Rebars covered in mill scale, along with rust, are falsely considered to provide protection against corrosive attack on their surfaces when embedded in concrete. The presence of the mill scale actually accelerates corrosive reactions. This is due to the cracks which form in the scale, as well as the presence of unstable oxides of iron. Both the cracks and the unstable iron oxides are conducive to the formation of galvanic cells which accelerate corrosive reactions in the rebar.

Due to the problems associated with mill scale, descaling of the rebar prior to its embedding in concrete may be performed. Although descaling improves the general corrosion resistance of the rebar, and also increases the threshold chloride concentration for the onset of a corrosion pitting attack, the process of descaling (typically conducted on-site) is very expensive, time consuming and requires cumbersome equipment. Other methods include surface coating, the usage of corrosion inhibitors, and the application of cathodic protection. However, the compositions and methods involved for each of these techniques are not only expensive but have a tendency to affect the quality of the concrete, as well as the bond strength between the concrete and the rebar.

Thus, an anti-corrosion treatment composition for steel rebar embedded in concrete solving the aforementioned problems is desired.

SUMMARY OF THE INVENTION

The anti-corrosion treatment composition for steel rebar embedded in concrete is a composition for application on the surface of steel rebar before the steel rebar is embedded in concrete. The composition can be applied on the steel rebar surface by dip coating, brushing, or spraying. The anti-corrosion treatment composition forms a treatment film on the steel rebar which controls both uniform corrosion and pitting corrosion of the steel rebar after it has been embedded in the concrete. The anti-corrosion treatment composition includes an inorganic acid, an organic acid, polyethylene glycol and water. The inorganic acid may be phosphoric acid, phosphonic acid, nitric acid, sulfuric acid or combinations thereof. The organic acid may be tannic acid, oleic acid, acetic acid, formic acid or combinations thereof. The inorganic acid forms between approximately 3.9 wt % and approximately 15.0 wt % of the anti-corrosion treatment composition, the organic acid forms between approximately 0.1 wt % and approximately 2.9 wt % of the anti-corrosion treatment composition, the polyethylene glycol forms between approximately 2.0 wt % and approximately 10.7 wt % of the anti-corrosion treatment composition, and the remainder of the anti-corrosion treatment composition is water.

In an alternative embodiment of the anti-corrosion treatment composition, either 1,2,3 benzotriazole (BTA) or sodium tetra borate deca hydrate (STB) is added as a film forming agent. In this embodiment, the inorganic acid forms between approximately 3.9 wt % and approximately 15.0 wt % of the anti-corrosion treatment composition, the organic acid forms between approximately 0.1 wt % and approximately 2.7 wt % of the anti-corrosion treatment composition, the polyethylene glycol forms between approximately 2.0 wt % and approximately 10.0 wt % of the anti-corrosion treatment composition, the 1,2,3 benzotriazole (BTA) forms between approximately 0.4 wt % and approximately 6.7 wt % of the anti-corrosion treatment composition, and the remainder of the anti-corrosion treatment composition is water.

In a further alternative embodiment, 1,2,3 benzotriazole (BTA) and sodium tetraborate decahydrate (STB) are added to the anti-corrosion treatment composition. In this embodiment, the inorganic acid forms between approximately 3.8 wt % and approximately 13.9 wt % of the anti-corrosion treatment composition, the organic acid forms between approximately 0.1 wt % and approximately 2.6 wt % of the anti-corrosion treatment composition, the polyethylene glycol forms between approximately 2.0 wt % and approximately 9.9 wt % of the anti-corrosion treatment composition, the 1,2,3 benzotriazole (BTA) forms between approximately 0.6 wt % and approximately 2.2 wt % of the anti-corrosion treatment composition, the sodium tetra borate deca hydrate (STB) forms between approximately 1.2 wt % and approximately 5.3 wt % of the anti-corrosion treatment composition, and the remainder of the anti-corrosion treatment composition is water.

These and other features of the present invention will become readily apparent upon further review of the following specification.

DETAILED DESCRIPTION OF THE PREFERRED EMBODIMENTS

Figure 1A:
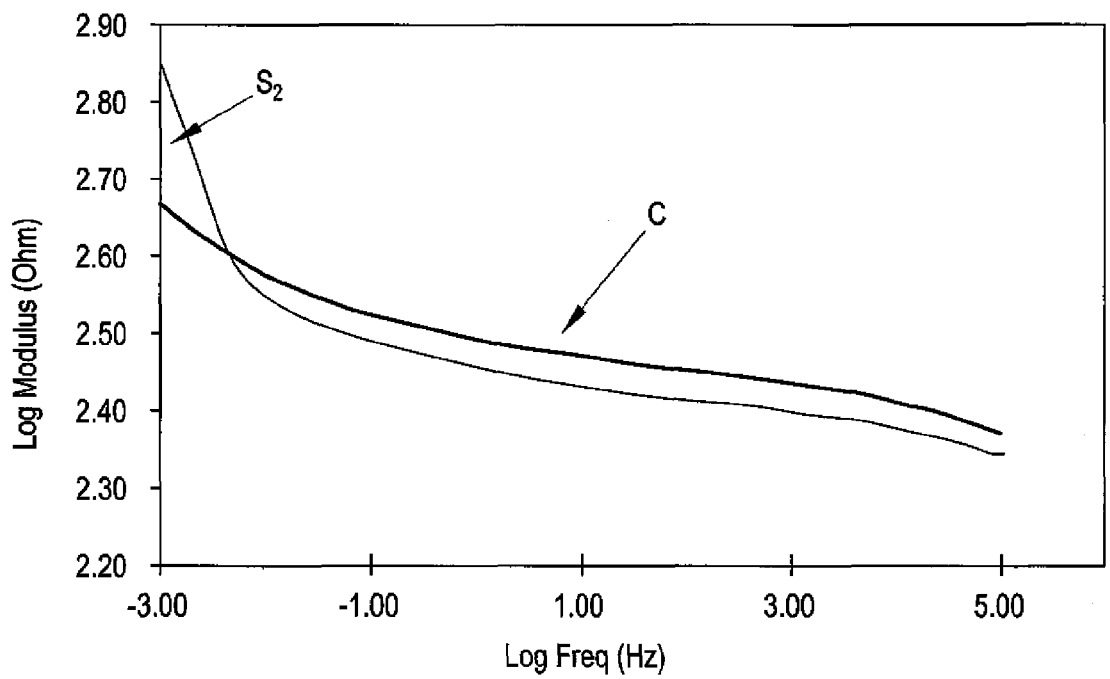
FIG. 1A is a graph comparing electrochemical Bode log frequency-log modulus impedance plots for an untreated control steel rebar sample ("C") and a steel rebar sample coated with an anti-corrosion treatment composition ("$S_2$") according to the present invention, where each sample was embedded in concrete and given wet/dry tests over a period of 120 days.

The anti-corrosion treatment composition for steel rebar embedded in concrete is a composition for application to a surface of steel rebar before the steel rebar is embedded in concrete. The application of the anti-corrosion treatment composition forms a treatment film on the steel rebar which controls both uniform corrosion and pitting corrosion of the steel rebar after it has been embedded in the concrete. In a first embodiment, the anti-corrosion treatment composition includes an inorganic acid, an organic acid, polyethylene glycol and water. This first solution is referred to herein as "$S_1$". Although phosphoric acid is the preferred inorganic acid, the inorganic acid may be phosphoric acid, phosphonic acid, nitric acid, sulfuric acid or combinations thereof. The phosphoric acid can be ortho-phosphoric acid. Further, although tannic acid is the preferred organic acid, the organic acid may be tannic acid, oleic acid, acetic acid, formic acid or combinations thereof. Other similar organic acids can be used which are completely or partially soluble in inorganic acids or in their water solutions. The inorganic acid may form between approximately 3.9 wt % and approximately 15.0 wt % of the anti-corrosion treatment composition, although the preferred range is between approximately 5.8 wt % and approximately 13.5 wt %. The organic acid may form between approximately 0.1 wt % and approximately 2.9 wt % of the anti-corrosion treatment composition, although the preferred range is between approximately 0.4 wt % and approximately 2.5 wt %. The polyethylene glycol may form between approximately 2.0 wt % and approximately 10.7 wt % of the anti-corrosion treatment composition, although the preferred range is between approximately 2.8 wt % and approximately 8.5 wt %. The remainder of the anti-corrosion treatment composition is water.

In order to make solution $S_1$, 30-100 mL (preferably 20-85 mL) of concentrated phosphoric acid (75% concentration) was dissolved in 750 mL of water. At room temperature, the corresponding mass of the 75% concentration phosphoric acid was between approximately 31.58 g and approximately 157.9 g (preferably between approximately 47.37 g and approximately 134.2 g). 1 to 30 g (preferably 3 to 25 g) of tannic acid was then blended under constant stirring into the solution. Next, 20 to 100 mL (preferably 15-75 mL) of polyethylene glycol 400 (PEG 400) was added and the solution was stirred vigorously for between one and 100 minutes (preferably 5-30 minutes). At room temperature, the equivalent mass of the PEG 400 was between approximately 16.92 g and approximately 112.8 g (preferably, between approximately 22.56 g and approximately 84.6 g). Water may be added to the above solution, as needed, to make 1 L of solution $S_1$.

Rebar samples covered with mill black scale were dipped in solution $S_1$ for 5-60 seconds (preferably for 10-30 seconds). The rebar samples were then shed dried for 3-24 hours (preferably for 3-6 hours) before embedding them in cement mortars. The cylindrical mortars used in the experiment each had a diameter of 80 mm and were prepared by mixing cement, water and sand in a ratio of 1:0.5:2. The rebar samples treated with solution $S_1$ were fixed in the middles of the respective mortars and a graphite rod was also embedded in each mortar to act as an auxiliary electrode during impedance studies, as will be described in greater detail below.

In an alternative embodiment of the anti-corrosion treatment composition (solution "$S_2$"), 1,2,3 benzotriazole (BTA), is added as a film forming agent. In this embodiment, the inorganic acid may form between approximately 3.9 wt % and approximately 15.0 wt % of the anti-corrosion treatment composition, although the preferred range is between approximately 5.8 wt % and approximately 12.7 wt %. The organic acid may form between approximately 0.1 wt % and approximately 2.7 wt % of the anti-corrosion treatment composition, although the preferred range is between approximately 0.4 wt % and approximately 2.4 wt %. The polyethylene glycol may form between approximately 2.0 wt % and approximately 10.0 wt % of the anti-corrosion treatment composition, although the preferred range is between approximately 2.8 wt % and approximately 8.0 wt % of the anti-corrosion treatment composition. The 1,2,3 benzotriazole (BTA) may form between approximately 0.4 wt % and approximately 6.7 wt % of the anti-corrosion treatment composition, although the preferred range is between approximately 1.2 wt % and approximately 5.7 wt %. The remainder of the anti-corrosion treatment composition is water.

In another alternative embodiment, sodium tetra borate decahydrate (STB) was added to solution $S_1$. Following the same method described above for solution S1, between 7-35 g per liter (preferably between 5-8 g per liter) of the sodium tetra borate deca hydrate (STB) was added to solution $S_1$ to form solution "$S_3$".

In a further alternative embodiment, 1,2,3 benzotriazole (BTA) and sodium tetra borate deca hydrate (STB) are added to the anti-corrosion treatment composition to form solution "$S_4$". In this embodiment, the inorganic acid may form between approximately 3.8 wt % and approximately 13.9 wt % of the anti-corrosion treatment composition, although the preferred range is between approximately 5.7 wt % and approximately 16.2 wt %. The organic acid may form between approximately 0.1 wt % and approximately 2.6 wt % of the anti-corrosion treatment composition, although the preferred range is between approximately 0.4 wt % and approximately 2.4 wt %. The polyethylene glycol may form between approximately 2.0 wt % and approximately 9.9 wt % of the anti-corrosion treatment composition, although the preferred range is between approximately 2.7 wt % and approximately 8.1 wt %. The 1,2,3 benzotriazole (BTA) may form between approximately 0.6 wt % and approximately 2.2 wt % of the anti-corrosion treatment composition, although the preferred range is between approximately 0.9 wt % and approximately 1.9 wt %. The sodium tetra borate deca hydrate (STB) may form between approximately 1.2 wt % and approximately 5.3 wt % of the anti-corrosion treatment composition, although the preferred range is between approximately 1.5 wt % and approximately 2.9 wt %. The remainder of the anti-corrosion treatment composition is water.

As noted above, impedance studies were conducted in order to test the effectiveness of the anti-corrosion treatment compositions. Rebar samples treated with solutions $S_1$, $S_2$, $S_3$ and $S_4$ were each embedded in mortars, as described above, and were compared against a control rebar sample, which was untreated and also embedded in an identical mortar. The rebar samples were conventional, with each having a composition of 0.108 wt % of carbon, 0.177 wt % of silicon, 0.409 wt % of manganese, 0.047 wt % of phosphorus, 0.067 wt % of sulfur, 0.009 wt % of chromium, 0.020 wt % of nickel, 0.019 wt % of copper, and the balance being iron. Each rebar sample was covered with mill scale corrosion and was treated as described above with regard to solution $S_1$, except for the control samples "C", which were untreated.

The polarization resistance of the rebar samples (both treated and untreated) were measured by electrochemical impedance spectroscopy by applying a sinusoidal voltage of 10 mV at their corrosion potentials. For the determination of polarization resistance, a constant phase element (CPE) model was used to extract data from the respective plots. According to Stearn-Geary equation, the polarization resistance is inversely related to the corrosion current density as $$I_{corr} = \frac{B}{R_p},$$

where $I_{corr}$ is the corrosion current density, B is a constant, and $R_p$ is the polarization resistance (measured in $\Omega \cdot cm^2$).

Figure 1B:
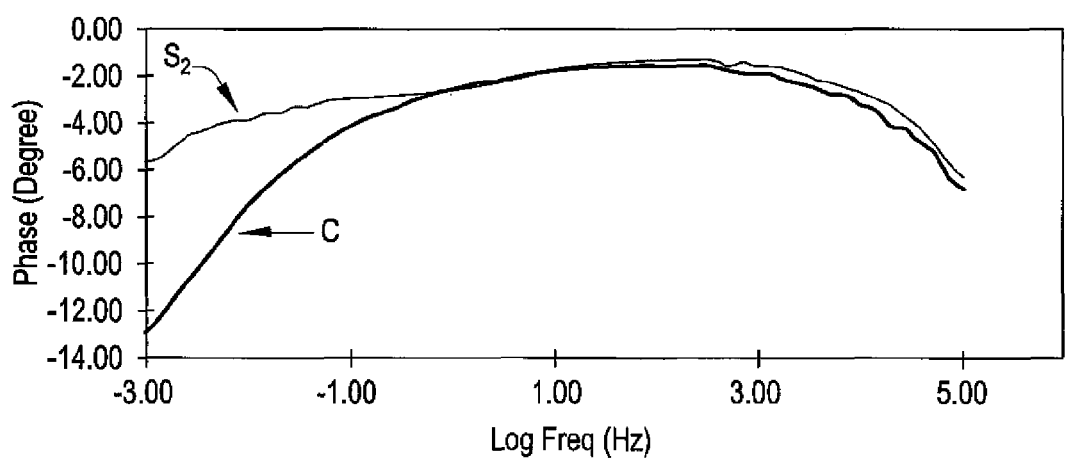
FIG. 1B is a graph comparing electrochemical Bode log frequency-phase impedance plots for the untreated control steel rebar sample ("C") and the steel rebar sample coated with the anti-corrosion treatment composition ("$S_2$"), where each sample was embedded in concrete and given dry tests over a period of 120 days.

FIG. 1A shows a comparison of electrochemical Bode log frequency-log modulus impedance plots for the untreated control steel rebar sample C and a steel rebar sample coated with the anti-corrosion treatment composition $S_2$. Each sample was embedded in concrete, as described above, and given wet/dry tests over a period of 120 days. Similarly, FIG. 1B shows a comparison of electrochemical Bode log frequency-phase impedance plots for the untreated control steel rebar sample C and the steel rebar sample coated with the anti-corrosion treatment composition $S_2$, where each sample was embedded in concrete and given dry tests over a period of 120 days. As shown, the log frequency-log modulus plots of FIG. 1A exhibit very high values of impedance for sample $S_2$ when compared against the control sample C. The high frequency impedance for $S_2$ is also larger (at 105 Hz) than that of the control rebar samples C. Additionally, the frequency phase plots of FIG. 1B show two maxima, with one at about 0.1 Hz and the other at about 10 Hz. The log frequency-phase maxima are very distinctly visible for the $S_2$ rebar sample. These results suggest that the treatment film formed on the $S_2$ samples provides a protective effect when compared against untreated samples C.

The log-frequency phase plot of FIG. 1B has maxima for both rebar samples approaching zero at higher frequencies, which indicates a resistive behavior of the rebar for longer periods of exposure. These results suggest that with an increase in the passage of time, a very distinct and notable improvement of resistance to corrosion for the $S_2$ samples of rebar takes place.

Figure 2:
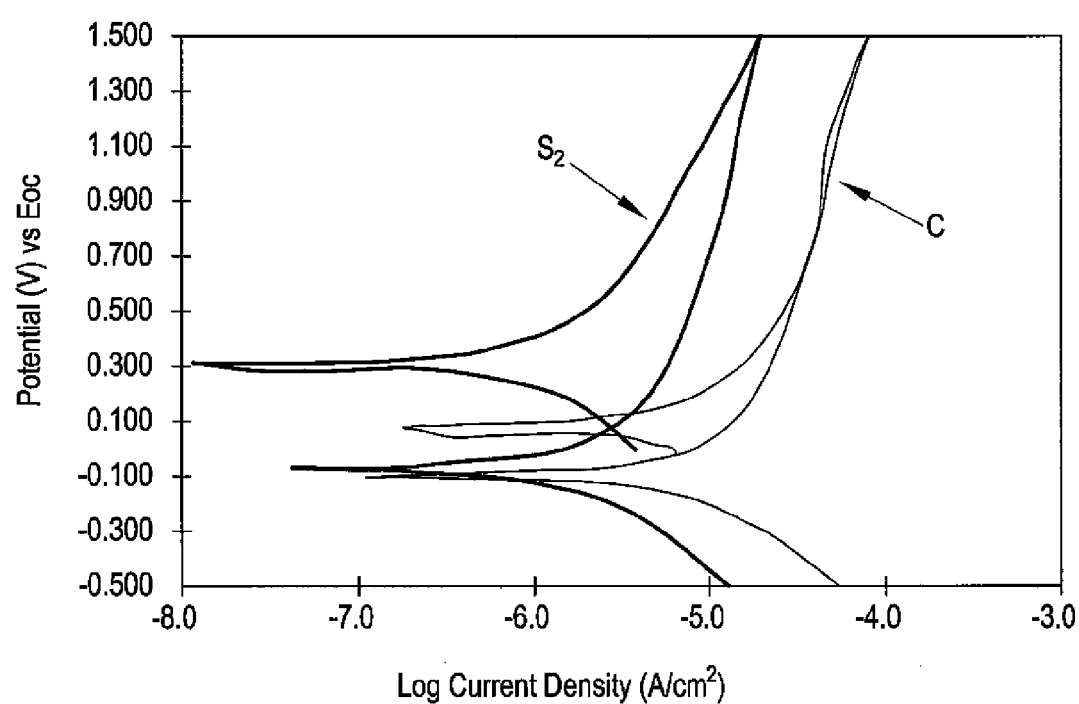
FIG. 2 is a graph comparing electrochemical cyclic polarization plots for the untreated control steel rebar sample ("C") and the steel rebar sample coated with the anti-corrosion treatment composition ("$S_2$"), where each sample was embedded in concrete and given wet/dry tests over a period of 120 days.

FIG. 2 shows the results of a comparison of electrochemical cyclic polarization plots for the untreated control steel rebar sample C and the steel rebar sample coated with the anti-corrosion treatment composition $S_2$, where each sample was embedded in concrete and given wet/dry tests over a period of 120 days. Here, the cyclic polarization behavior is studied to assess the resistivity of passive film formed on both rebar samples for inward diffusion of $O_2$ and outward migration of cations from their surfaces, as well as to assess their vulnerability to pitting corrosion. The plots of FIG. 2 show that the corrosion potentials of the control sample C and the treated sample $S_2$ were very close to one another, however the untreated sample C had a limiting current density on the order of $10^{-4.5}$ A/cm$^2$, while the treated sample $S_2$ had a limiting current density a degree of magnitude lower, on the order of $10^{-5.5}$ A/cm$^2$. Further, the back scanning of potential for the control sample C re-traces on forward scanning, but the back scanning of potential for the treated sample $S_2$ develops a lower density current loop. It can also be seen that none of the rebars exhibited pitting tendency during the cyclic polarization and that the cathodic polarization plots for treated sample $S_2$ show a higher degree of polarization than that of control sample C.

In addition to the above, the polarization resistance $R_p$ was also determined for the various treatment solutions described above and compared against that of control sample C. The half-cell potential of each sample was measured against a saturated calomel electrode. The results, shown in Table 1 below, are given for measurements conducted after 120 days of wet/dry tests of the mortars.

TABLE 1

Corrosion Resistance of Rebar Samples as a Function of Polarization Resistance

| Parameters | Rebar Samples | | | | |
|---|---|---|---|---|---|
| | C | $S_1$ | $S_2$ | $S_3$ | $S_4$ |
| $R_p$ (k$\Omega \cdot cm^2$) | 16.7 | 25.5 | 28.2 | 26.3 | 29.5 |
| % Improvement in Corrosion Resistance | — | 34.5 | 40.8 | 36.5 | 43.4 |

It is to be understood that the present invention is not limited to the embodiments described above, but encompasses any and all embodiments within the scope of the following claims.

We claim:

1. An anti-corrosion treatment composition for steel rebar embedded in concrete, comprising:
    an inorganic acid comprising between approximately 5.8 wt % and approximately 13.5 wt % of the anti-corrosion treatment composition, wherein said inorganic acid is phosphoric acid;
    an organic acid comprising between approximately 0.4 wt % and approximately 2.5 wt % of the anti-corrosion treatment composition, wherein said organic acid is selected from the group consisting of tannic acid, oleic acid, acetic acid, formic acid and combinations thereof;
    polyethylene glycol comprising between approximately 2.8 wt % and approximately 8.5 wt % of the anti-corrosion treatment composition; and
    water comprising a remainder of the anti-corrosion treatment composition.

2. The anti-corrosion treatment composition for steel rebar embedded in concrete as recited in claim 1, wherein said organic acid is tannic acid.

3. An anti-corrosion treatment composition for steel rebar embedded in concrete, comprising:
    an inorganic acid comprising between approximately 3.9 wt % and approximately 15.0 wt % of the anti-corrosion treatment composition, wherein said inorganic acid is selected from the group consisting of phosphoric acid, phosphonic acid, nitric acid, sulfuric acid and combinations thereof;
    an organic acid comprising between approximately 0.1 wt % and approximately 2.7 wt % of the anti-corrosion treatment composition, wherein said organic acid is selected from the group consisting of tannic acid, oleic acid, acetic acid, formic acid and combinations thereof;
    polyethylene glycol comprising between approximately 2.0 wt % and approximately 10.0 wt % of the anti-corrosion treatment composition;

1,2,3 benzotriazole comprising between approximately 0.4 wt % and approximately 6.7 wt % of the anti-corrosion treatment composition; and water comprising a remainder of the anti-corrosion treatment composition.

4. The anti-corrosion treatment composition for steel rebar embedded in concrete as recited in claim 3, wherein said inorganic acid comprises between approximately 5.8 wt % and approximately 12.7 wt % of the anti-corrosion treatment composition.

5. The anti-corrosion treatment composition for steel rebar embedded in concrete as recited in claim 4, wherein said organic acid comprises between approximately 0.4 wt % and approximately 2.4 wt % of the anti-corrosion treatment composition.

6. The anti-corrosion treatment composition for steel rebar embedded in concrete as recited in claim 5, wherein said polyethylene glycol comprises between approximately 2.8 wt % and approximately 8.0 wt % of the anti-corrosion treatment composition.

7. The anti-corrosion treatment composition for steel rebar embedded in concrete as recited in claim 6, wherein said 1,2,3 benzotriazole comprises between approximately 1.2 wt % and approximately 5.7 wt % of the anti-corrosion treatment composition.

8. The anti-corrosion treatment composition for steel rebar embedded in concrete as recited in claim 7, wherein said inorganic acid is phosphoric acid.

9. The anti-corrosion treatment composition for steel rebar embedded in concrete as recited in claim 8, wherein said organic acid is tannic acid.

10. An anti-corrosion treatment composition for steel rebar embedded in concrete, comprising:
an inorganic acid comprising between approximately 3.8 wt % and approximately 13.9 wt % of the anti-corrosion treatment composition, wherein said inorganic acid is selected from the group consisting of phosphoric acid, phosphonic acid, nitric acid, sulfuric acid and combinations thereof;
an organic acid comprising between approximately 0.1 wt % and approximately 2.6 wt % of the anti-corrosion treatment composition, wherein said organic acid is selected from the group consisting of tannic acid, oleic acid, acetic acid, formic acid and combinations thereof;
polyethylene glycol comprising between approximately 2.0 wt % and approximately 9.9 wt % of the anti-corrosion treatment composition;
1,2,3 benzotriazole comprising between approximately 0.6 wt % and approximately 2.2 wt % of the anti-corrosion treatment composition;
sodium tetra borate deca hydrate comprising between approximately 1.2 wt % and approximately 5.3 wt % of the anti-corrosion treatment composition and
water comprising a remainder of the anti-corrosion treatment composition.

11. The anti-corrosion treatment composition for steel rebar embedded in concrete as recited in claim 10, wherein said inorganic acid comprises between approximately 5.7 wt % and approximately 16.2 wt % of the anti-corrosion treatment composition.

12. The anti-corrosion treatment composition for steel rebar embedded in concrete as recited in claim 11, wherein said organic acid comprises between approximately 0.4 wt % and approximately 2.4 wt % of the anti-corrosion treatment composition.

13. The anti-corrosion treatment composition for steel rebar embedded in concrete as recited in claim 12, wherein said polyethylene glycol comprises between approximately 2.7 wt % and approximately 8.1 wt % of the anti-corrosion treatment composition.

14. The anti-corrosion treatment composition for steel rebar embedded in concrete as recited in claim 13, wherein said 1,2,3 benzotriazole comprises between approximately 0.9 wt % and approximately 1.9 wt % of the anti-corrosion treatment composition.

15. The anti-corrosion treatment composition for steel rebar embedded in concrete as recited in claim 14, wherein said sodium tetra borate deca hydrate comprises between approximately 1.5 wt % and approximately 2.9 wt % of the anti-corrosion treatment composition.

16. The anti-corrosion treatment composition for steel rebar embedded in concrete as recited in claim 15, wherein said inorganic acid is phosphoric acid and said organic acid is tannic acid.

* * * * *